United States Patent
Chen et al.

(10) Patent No.: US 11,654,603 B2
(45) Date of Patent: May 23, 2023

(54) INJECTION MOLDING APPARATUS AND INJECTION MOLDING METHOD

(71) Applicant: Chung Yuan Christian University, Taoyuan (TW)

(72) Inventors: Shia-Chung Chen, Taoyuan (TW);
Yung-Hsiang Chang, Taoyuan (TW);
Tzu-Hsiang Wei, Taoyuan (TW);
Pi-Lin Tsai, Taoyuan (TW)

(73) Assignee: Chung Yuan Christian University, Taoyuan (TW)

( * ) Notice: Subject to any disclaimer, the term of this patent is extended or adjusted under 35 U.S.C. 154(b) by 134 days.

(21) Appl. No.: 17/027,720

(22) Filed: Sep. 22, 2020

(65) Prior Publication Data
US 2022/0040897 A1 Feb. 10, 2022

(30) Foreign Application Priority Data
Aug. 4, 2020 (TW) ................. 109126325

(51) Int. Cl.
B29C 45/78 (2006.01)
B29C 45/37 (2006.01)
B29C 45/77 (2006.01)

(52) U.S. Cl.
CPC .............. B29C 45/78 (2013.01); B29C 45/37 (2013.01); B29C 45/77 (2013.01);
(Continued)

(58) Field of Classification Search
CPC ......... B29C 45/78; B29C 45/37; B29C 45/77; B29C 2945/76006; B29C 2945/7604; B29C 2945/7626; B29C 2945/76498; B29C 2945/76531; B29C 45/2669

USPC ......................................................... 264/40.6
See application file for complete search history.

(56) References Cited

U.S. PATENT DOCUMENTS 2,191,703 A * 2/1940 Anderson ......... B29C 45/14819
264/161
5,707,659 A 1/1998 Erikson
(Continued)

FOREIGN PATENT DOCUMENTS

CN 104483920 4/2015
CN 207594308 7/2018
(Continued)

OTHER PUBLICATIONS

Gim (Gim, J. et al, Detection Method of Filling Imbalance in a Multi-Cavity Mold for Small Lens, International Journal of Precision Engineering and Manufacturing vol. 16, No. 3, pp. 531-535, Mar. 2015). (Year: 2015).*

(Continued)

*Primary Examiner* — Matthew J Daniels
*Assistant Examiner* — Gregory C. Grosso
(74) *Attorney, Agent, or Firm* — JCIPRNET

(57) ABSTRACT

An injection molding apparatus including a mold, an injection device and at least one sensor is provided. The mold has a mold cavity. The injection device is adapted to inject a material into the mold cavity such that the material is formed into a forming article. The at least one sensor is disposed on the mold and adapted to sense at least one of a temperature and a pressure in the mold cavity. The at least one sensor is located at an inner surface of the mold cavity and corresponds to a non-appearance surface of the forming article. In addition, an injection molding method is also provided.

4 Claims, 2 Drawing Sheets

(52) U.S. Cl.
CPC ........... *B29C 2945/7604* (2013.01); *B29C 2945/76006* (2013.01); *B29C 2945/7626* (2013.01); *B29C 2945/76498* (2013.01); *B29C 2945/76531* (2013.01)

(56) References Cited

U.S. PATENT DOCUMENTS

| | | | | |
|---|---|---|---|---|
| 6,063,315 | A * | 5/2000 | Keller | B29C 66/54 264/572 |
| 9,393,743 | B2 | 7/2016 | Kraemer | |
| 2005/0230864 | A1* | 10/2005 | Ozasa | B29C 43/36 264/102 |
| 2016/0089823 | A1* | 3/2016 | Ikeda | H01B 13/06 264/272.13 |
| 2016/0208951 | A1* | 7/2016 | Singh | B29C 45/281 |
| 2019/0308354 | A1 | 10/2019 | Shen et al. | |

FOREIGN PATENT DOCUMENTS

| | | |
|---|---|---|
| EP | 0800908 | 10/1997 |
| EP | 3552796 | 10/2019 |
| JP | S58119839 | 7/1983 |
| JP | H0631764 | 2/1994 |
| JP | 2002264192 | 9/2002 |
| JP | 2007001114 | 1/2007 |
| JP | 2007192802 | 8/2007 |
| JP | 2013184165 | 9/2013 |
| JP | 2015047858 | 3/2015 |
| JP | 2019171871 | 10/2019 |
| TW | I389600 | 3/2013 |
| TW | I508837 | 11/2015 |
| TW | I674959 | 10/2019 |
| TW | 201943533 | 11/2019 |
| TW | 202010622 | 3/2020 |

OTHER PUBLICATIONS

"Office Action of Taiwan Counterpart Application", dated Aug. 4, 2021, p. 1-p. 10.
"Search Report of Europe Counterpart Application", dated Apr. 21, 2021, p. 1-p. 7.
"Office Action of Japan Counterpart Application", dated Oct. 7, 2021, p. 1-p. 4.
"Office Action of Taiwan Counterpart Application", dated Sep. 21, 2022, p. 1-p. 8.

* cited by examiner

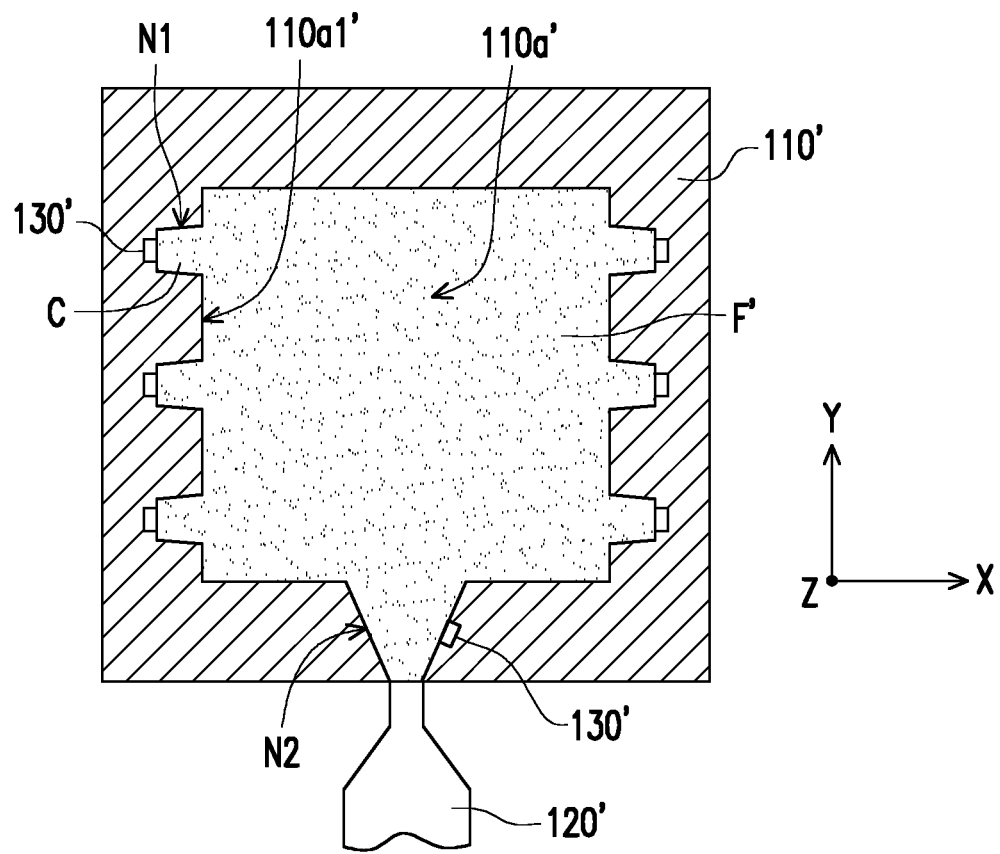

FIG. 4

| A mold and at least one sensor are provided, the mold includes a mold cavity, and the at least one sensor is disposed on the mold and adapted to sense at least one of a temperature and a pressure in the mold cavity | — S101 |

| A material is formed into a forming article by injecting the material into the mold cavity through an injection device, and the at least one sensor is located on an inner surface of the mold cavity and corresponds to a non-appearance surface of the forming article | — S102 |

FIG. 5

INJECTION MOLDING APPARATUS AND INJECTION MOLDING METHOD

CROSS-REFERENCE TO RELATED APPLICATION

This application claims the priority benefit of Taiwan application Ser. No. 109126325, filed on Aug. 4, 2020. The entirety of the above-mentioned patent application is hereby incorporated by reference herein and made a part of this specification.

BACKGROUND

Technical Field

The disclosure relates to a molding apparatus and a molding method, and more particularly to an injection molding apparatus and an injection molding method.

Description of Related Art

Injection molding is a manufacturing process for producing parts made of thermoplastic or thermosetting plastic. A plastic material is heated and melted to be in a fluid state in the barrel of an injection molding machine; and then under the pressure of a plunger or a screw stem, the plastic material is compressed and forced forward to be rapidly injected into a closed mold with a much cooler temperature through a nozzle at the front of the barrel. After cooling and shaping for a period of time, the mold is open and an injection molding product is obtained.

In an injection molding process, factors such as injection pressure, a mold temperature, a pressure holding time, and an ambient temperature will all affect the quality of an injection molding product. Conventional injection molding machines can estimate the quality of an injection molding product by sensing the pressure of the plastic material and the mold temperature. The sensor is usually disposed at the inner surface of the mold to sense the temperature and the pressure of the plastic material in the mold. However, the sensor disposed on the inner surface of the mold causes the inner surface to come with an unexpected shape or unevenness, which affects the quality of the injection molding product.

SUMMARY

The disclosure provides an injection molding apparatus and an injection molding method capable of improving the quality of an injection molding product.

An injection molding apparatus of the disclosure includes a mold, an injection device, and at least one sensor. The mold has a mold cavity. The injection device is adapted to inject a material into the mold cavity such that the material is formed into a forming article. The at least one sensor is disposed on the mold and adapted to sense at least one of a temperature and a pressure in the mold cavity. The at least one sensor is located at an inner surface of the mold cavity and corresponds to a non-appearance surface of the forming article.

In an embodiment of the disclosure, the at least one sensor includes a temperature sensor and a pressure sensor.

In an embodiment of the disclosure, the temperature sensor and the pressure sensor are integrated into a single sensing element.

In an embodiment of the disclosure, the inner surface of the mold cavity includes at least one concave portion, the at least one concave portion corresponds to a portion to-be-cut of the forming article, and the at least one sensor is located in the at least one concave portion.

In an embodiment of the disclosure, the at least one concave portion is a material injection area of the mold cavity or at least one overflow area of the mold cavity.

An injection molding method of the disclosure includes the following steps. A mold and at least one sensor are provided, the mold has a mold cavity, and the at least one sensor is disposed on the mold and adapted to sense at least one of a temperature and a pressure in the mold cavity. A material is formed into a forming article by injecting the material into the mold cavity through an injection device, and the at least one sensor is located at an inner surface of the mold cavity and corresponds to a non-appearance surface of the forming article.

In an embodiment of the disclosure, the step of providing the at least one sensor includes providing a temperature sensor and a pressure sensor.

In an embodiment of the disclosure, the step of providing the temperature sensor and the pressure sensor includes integrating the temperature sensor and the pressure sensor into a single sensing element.

In an embodiment of the disclosure, the step in which the inner surface of the mold cavity includes at least one concave portion, the at least one concave portion corresponds to a portion to-be-cut of the forming article, and the at least one sensor is provided includes a step of disposing the at least one sensor in the at least one concave portion.

In an embodiment of the disclosure, the at least one concave portion is a material injection area of the mold cavity or at least one overflow area of the mold cavity.

Based on the above, in the injection molding apparatus of the disclosure, the sensor corresponds to the non-appearance surface of the forming article, so the appearance surface of the forming article will not become uneven due to the arrangement of the sensor, thereby improving the quality of the injection molding product.

In order to make the aforementioned features and advantages of the disclosure comprehensible, embodiments accompanied with drawings are described in detail below.

BRIEF DESCRIPTION OF THE DRAWINGS

FIG. 4 shows that a material in the mold cavity of an injection molding apparatus is formed into a forming article according to another embodiment of the disclosure.

FIG. 5 is a flowchart of an injection molding method according to an embodiment of the disclosure.

DESCRIPTION OF THE EMBODIMENTS

Figure 1:
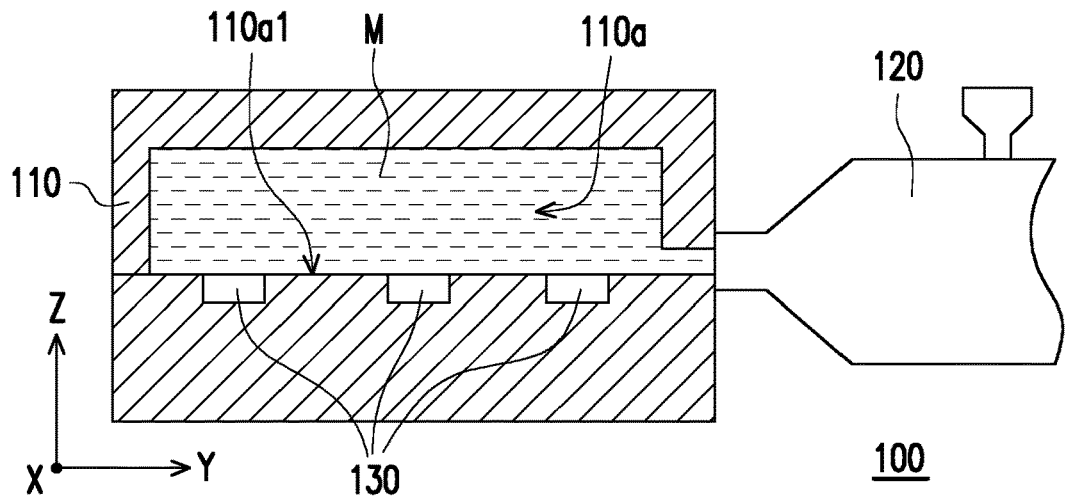
FIG. 1 is a schematic view of an injection molding apparatus according to an embodiment of the disclosure.
Figure 2:
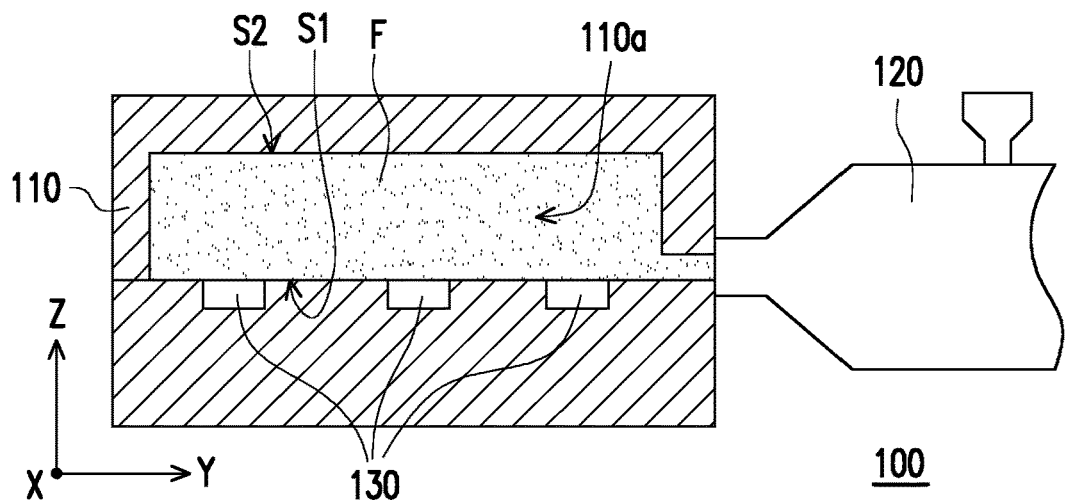
FIG. 2 shows that the material of FIG. 1 is formed into a forming article.

FIG. 1 is a schematic view of an injection molding apparatus according to an embodiment of the disclosure. FIG. 2 shows that the material of FIG. 1 is formed into a forming article. Referring to FIG. 1, an injection molding apparatus 100 of the embodiment includes a mold 110, an injection device 120, and at least one sensor 130 (multiple sensors 130 are shown). The mold 110 has a mold cavity 110a, and the injection device 120 is adapted to inject a material M into the mold cavity 110a so that the material M is solidified and formed into a forming article F.

The sensors 130 are disposed in the mold 110 and adapted to sense the temperature and the pressure in the mold cavity 110a, so that the injection molding apparatus 100 is capable of calculating the specific volume according to the temperature and the pressure of the material in the mold cavity 110a, and accordingly adjusts injection molding parameters. The injection molding parameters may include the injection pressure of the injection device 120, the temperature of the mold 110, and the pressure holding time performed by the injection device 120. The holding pressure refers to that the injection device 120 continues to apply an appropriate injection pressure after injecting the material into the mold 110 to provide a proper quantity of the material into the mold 110 until the material in the mold 110 is solidified. In this way, the shrinkage of the material in the mold 110 during the solidification process is prevented so that the dimensions of the injection molding product will meet expectations.

The sensors 130 are, for example, electrically connected to a computer device and adapted to transmit sensing signals to the computer device to calculate the specific volume and adjust the parameters. The computer device is, for example, integrated in the injection molding apparatus 100 or externally connected to the injection molding apparatus 100, but the disclosure is not limited thereto.

As shown in FIG. 2, the sensors 130 are located at an inner surface 110a1 of the mold cavity 110a and correspond to a non-appearance surface S1 of the forming article F. Thereby, an appearance surface S2 of the forming article F will not become uneven due to the arrangement of the sensor 130, so that the quality of the injection molding product is improved.

Figure 3:
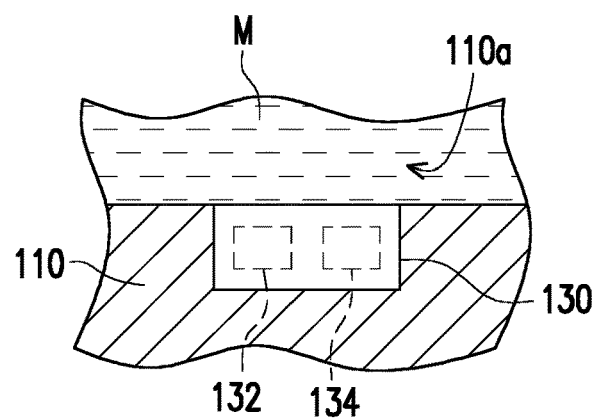
FIG. 3 is a schematic view of the sensor of FIG. 1.

FIG. 3 is a schematic view of the sensor of FIG. 1. Referring to FIG. 3, each sensor 130 of the embodiment includes a temperature sensor 132 and a pressure sensor 134, and the temperature sensor 132 and the pressure sensor 134 are integrated into a single sensing element (i.e., the sensor 130). In this way, compared to the arrangement of the temperature sensor and the pressure sensor separately disposed at different positions at the inner surface of the mold cavity, the integration of the temperature sensor 132 and the pressure sensor 134 into a single sensing element makes it possible to sense the temperature and the pressure at the same position, so as to accurately obtain the temperature and the pressure of a specific position in the mold cavity 110a, and accordingly accurately calculate the specific volume of the specific position.

In the embodiment in FIG. 1 and FIG. 2, the non-appearance surface S1 and the appearance surface S2 of the forming article F are respectively located on opposite sides of the forming article F. That is, the non-appearance surface S1 is the inner surface of a product. However, the disclosure is not limited thereto, and examples are illustrated below with drawings.

FIG. 4 shows that a material in the mold cavity of an injection molding apparatus is formed into a forming article according to another embodiment of the disclosure. As shown in FIG. 4, an inner surface 110a1' of a mold cavity 110a' of a mold 110' has at least one concave portion (shown as a concave portion N2 and a plurality of concave portions N1). The concave portion N2 is, for example, a material injection area, and an injection device 120' is adapted to inject a material into the mold cavity 110a' from the material injection area. The concave portions N1 are, for example, a plurality of overflow areas additionally disposed for an overflow of the material injected into the mold cavity 110a'. The parts of a forming article F' located in the concave portions N1 and N2 are a plurality of portions to-be-cut C, and a plurality of sensors 130' are located in the concave portions N1 and N2 respectively.

Since the portions to-be-cut C are not part of the injection molding product and are to be cut off in the subsequent process, the portions to-be-cut C may be regarded as non-appearance surfaces of the forming article F'. Even if the portion to-be-cut C has an uneven surface due to the arrangement of the sensor 130', the uneven surface is not present in the injection molding product after the portions to-be-cut C are cut off. In other embodiments, the sensor 130' may be merely disposed in the concave portion N2 but not be disposed in the concave portion N1, or the sensor 130' is merely disposed in the concave portion N1 but not in the concave portion N2. The disclosure is not limited thereto. In addition, the temperature sensor 132 and the pressure sensor 134 may be integrated into the sensor 130' to be a single sensing element same as the sensor 130 shown in FIG. 3.

The injection molding method according to an embodiment of the disclosure is illustrated below. FIG. 5 is a flowchart of an injection molding method according to an embodiment of the disclosure, which corresponds to the injection molding apparatus of the above-mentioned embodiment. Referring to FIG. 5, first, a mold and at least one sensor are provided. The mold has a mold cavity, and at least one sensor is disposed in the mold and adapted to sense at least one of the temperature and the pressure in the mold cavity (step S101). Then, a material is injected into the mold cavity through an injection device to form the material into a forming article. At least one sensor is located at an inner surface of the mold cavity and corresponds to a non-appearance surface of the forming article (step S102). In step S101, the temperature sensor 132 and the pressure sensor 134 shown in FIG. 3 may be provided, and the temperature sensor 132 and the pressure sensor 134 may be integrated into a single sensing element 130a. In the step S102, a plurality of sensors 130' may be respectively located in the concave portions N1 and N2 of the mold cavity 130 as shown in FIG. 4.

Based on the above, in the injection molding apparatus of the disclosure, the sensor corresponds to the non-appearance surface of the forming article, so the appearance surface of the forming article will not become uneven due to the arrangement of the sensor, thereby improving the quality of the injection molding product. In addition, the integration of the temperature sensor and the pressure sensor into a single sensing element makes it possible to sense the temperature and the pressure at the same position, so as to accurately obtain the temperature and the pressure of a specific position in the mold cavity, and accurately calculate the specific volume of the specific position. Accordingly, the injection molding parameters are adjusted in an effective manner, thereby further improving the quality of the injection molding product.

Although the disclosure has been described with reference to the above embodiments, it will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:
1. An injection molding apparatus, comprising:
   a mold comprising a mold cavity, wherein inner surfaces of the mold cavity comprises a plurality of concave portions;

an injection device adapted to inject a material into the mold cavity such that the material is formed into a forming article; and a plurality of sensors disposed on the mold and adapted to sense a plurality of temperatures and a plurality of pressures in the mold cavity, wherein at least two of the plurality of sensors are located at one of the inner surfaces of the mold cavity and corresponds to a surface of the forming article, at least another two of the plurality of sensors are located at another one of the inner surfaces of the mold cavity and correspond to another surface of the forming article, the plurality of concave portions correspond to a plurality of protruding portions of the forming article respectively, and the plurality of sensors are located in the plurality of concave portions respectively, wherein each of the plurality of concave portions corresponds to only one of the plurality of sensors.

2. The injection molding apparatus according to claim 1, wherein each of the plurality of sensors comprises a temperature sensor and a pressure sensor.

3. The injection molding apparatus according to claim 2, wherein the temperature sensor and the pressure sensor are integrated into a single sensing element.

4. The injection molding apparatus according to claim 1, wherein each of the plurality of concave portions is a material injection area of the mold cavity or an overflow area of the mold cavity.

* * * * *